US006343281B1

(12) United States Patent
Kato

(10) Patent No.: US 6,343,281 B1
(45) Date of Patent: Jan. 29, 2002

(54) DEVICE AND METHOD FOR PREVENTING FRAUDULENT COPIES OF DATA CONTAINING ENCRYPTED COPY-MANAGEMENT INFORMATION AND RECORDING MEDIUM

(75) Inventor: Takehisa Kato, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/114,301

(22) Filed: Jul. 10, 1998

(30) Foreign Application Priority Data

Jul. 11, 1997 (JP) .............................................. 9-186837

(51) Int. Cl.[7] .............................................. G11B 7/007
(52) U.S. Cl. .............................. 705/57; 705/51; 380/201
(58) Field of Search ................................ 380/4, 21, 25, 380/30, 201, 203, 277, 281, 284; 705/1, 51, 57, 71; 713/180, 165, 193

(56) References Cited

U.S. PATENT DOCUMENTS

| 5,182,770 A | * | 1/1993 | Medveczky et al. ........... 380/4 |
| 5,185,792 A | * | 2/1993 | Shimada ........................ 380/4 |
| 5,453,968 A | * | 9/1995 | VeLdhuis et al. ............. 369/84 |
| 5,574,787 A | * | 11/1996 | Ryan ............................. 380/5 |
| 5,629,980 A | * | 5/1997 | Stefik et al. .................... 380/4 |
| 5,659,613 A | * | 8/1997 | Copeland et al. .............. 380/3 |
| 5,673,316 A | * | 9/1997 | Auerbach et al. .............. 380/4 |
| 5,719,937 A | * | 2/1998 | Warren et al. ................. 380/4 |
| 5,757,907 A | * | 5/1998 | Cooper et al. ................. 380/4 |
| 5,796,824 A | * | 8/1998 | Hasebe et al. ................. 380/4 |
| 5,991,500 A | * | 11/1999 | Kanota et al. ................ 386/94 |
| 5,867,579 A | * | 12/1999 | Saito ............................ 380/25 |
| 6,009,174 A | * | 12/1999 | Tatebayashi et al. .......... 380/21 |
| 6,035,094 A | * | 3/2000 | Kori ............................. 386/94 |
| 6,266,480 B1 | * | 7/2001 | Ezaki et al. ................... 386/94 |

FOREIGN PATENT DOCUMENTS

| EP | 0789361 A2 | * | 8/1997 | ......... G11B/27/034 |
| EP | 0 896470 A1 | * | 2/1999 | ............ H04N/5/19 |

OTHER PUBLICATIONS

DVD video encryption update: Hollywood having cake and eating it; E Media Professional; Wilton; Jun. 1997; Kilroy Hughes.*

Copy–protection questions delay digital rollouts; Electronic Engineering Times; Manhasset; Feb. 3, 1997; Junko Yoshida.*

Protecting digital media content, Memon, Nasir; Wong, Ping Wah; Communications of the ACM v41n7 pp: 34–43; Jul. 1998, ISSN 0001–0782.*

* cited by examiner

Primary Examiner—Eric W. Stamber
Assistant Examiner—Yehdega Retta
(74) Attorney, Agent, or Firm—Finnegan, Henderson, Farabow, Garrett, & Dunner, L.L.P.

(57) ABSTRACT

A device to be used with digital data copying apparatus for preventing fraudulent copies of a digital data is disclosed. The digital data includes an encrypted data main body and encrypted copy management information for controlling permission with regard to copying the data main body. A determining section determines if permission be granted for copying the digital data or not depending on if the copy management information satisfies predetermined requirements or not. A prohibition processing section prohibits any operation of effectively copying the digital data when the determining section determines that permission should not be granted for copying the digital data.

11 Claims, 10 Drawing Sheets

DEVICE AND METHOD FOR PREVENTING FRAUDULENT COPIES OF DATA CONTAINING ENCRYPTED COPY-MANAGEMENT INFORMATION AND RECORDING MEDIUM

BACKGROUND OF THE INVENTION

This invention relates to a device and a method for preventing fraudulent copies of data and also to a recording medium. More specifically, this invention relates to a device and a method for preventing fraudulent copies of data on digitized documents, sounds, images and/or programs and also to a recording medium to be suitably used with such a device.

In recent years, the development and commercialization of digital recording/reproducing apparatus has made it possible to transfer data from a such apparatus to another for the purpose of copying without degrading the quality of data particularly in terms of the images and/or the sounds to be reproduced by the data.

However, the ability of copying data without degrading the quality thereof can inevitably entail illegal sales of copies of audio-visual works or pirating, infringing the copyright of the authors of the works. Illegal copies have to be firmly prevented from taking place because it is technologically easy to copy digitized works and distribute copies to indefinite people by means of large capacity digital recording/reproducing apparatus such as D-VCRs and DVD-RAMs. Now, many authors of digitized images and other digitized works share a sense of crisis under these circumstances.

While various techniques may be conceivable for pirating, any pirate has to follow a process of receiving the data for the object of pirating from a data reproducing device such as a DVD-ROM drive or a DVD-ROM and then copying the data by means of a digital recording device such as a DVD-RAM.

There is known a management system called SCMS (serial copy-management system) to be used with digital recording/reproducing apparatus such as DATs and MDs having a capacity smaller than DVDs for preventing fraudulent copies from being made.

Data to copied from a CD to an MD (or a DAT) or from an MD (or a DAT) to another MD (or another DAT) by means of an SCMS carries a piece of copy information added to the data head. The copy information is a 2-bit data. If the copy information on the master disc is "00", any data copied from the master disc will carry the copy information of "00" to indicate that it is free for copying.

If, the copy information on the master disc is "10", any data may copied directly from the master disc (to produce a first generation copy) but no data can be copied form the first generation copy (to produce a second generation copy). In other words, when data are copied from the master disc, the copy information carried by the copied data, or the data of the first generation copy, is counted up to become "11" and no data can be copied if it carries the copy information of "11" so that any second generation copy will be prevented from being produced.

The above described system refers to a method for preventing fraudulent copies by means of a digital recording/reproducing apparatus designed to prevent copies that infringe the copyright of the author of the original from being fraudulently made. However, if each apparatus is provided with anti-fraud measures, a pirate can illegally copy the data being transmitted from an apparatus to another somewhere on the transmission path to make such anti-fraud measures powerless.

As known and popular anti-fraud measures for data transmission, confidential data are often encrypted. Encryption systems are generally categorized as open key systems and secret key systems, although the latter are popularly used when data are to be transmitted and processed at high speed.

For encrypting data by means of a secret key, the two parties at the opposite end of the transmission line talk with each other to determine the secret key to be used for the coming communication in a cryptic system.

Thus, if the secret key is identified by a third party and fraudulently used for pirating, then the two parties will have to select a new secret key to continue the communication to maintain, if not lost, the confidentiality of the data. Thus, there is a need for effective cryptic systems that can be used for data transmission among digital recording/reproducing apparatus.

There is also a need for devices that can effectively prevent fraudulent copies of data. The above cited SCMS allows to produce first generation copies so that pirates can freely produce such copies for sale. Additionally, frauds can forge the copy information of "00" to freely make illegal copies.

Therefore, there is a strong need for a copy management method that is more reliable, more elaborate and more realistic than the SCMS and can be applied to large capacity digital recording/reproducing apparatus that potentially involve serious copyright problems.

BRIEF SUMMARY OF THE INVENTION

In view of the above identified circumstances, it is therefore a first object of the present invention to provide a device and a method for effectively and reliably preventing any illegal access to the copy-management information contained in the data to be handled and also to a recording medium to be suitably used with such a device.

A second object of the invention is to provide a device and a method for effectively preventing any fraudulently copied data from being reproduced.

A third object of the invention is to provide a device and a method for preventing fraudulent copies by means of an elaborate copy management system.

According to a first aspect of the invention, the above objects and other objects are achieved by providing a device to be used with digital data copying apparatus for preventing fraudulent copies of a digital data;

the digital data including an encrypted data main body and encrypted copy management information for controlling permission with regard to copying the data main body;

the device comprising:
a determining section for determining if permission be granted for copying the digital data or not based on if the copy management information satisfies predetermined requirements or not; and
a prohibition processing section for prohibiting any operation of effectively copying the digital data when the determining section determines that permission should not be granted for copying the digital data.

According to a second aspect of the invention, there is provided a device to be used with digital data copying apparatus for preventing fraudulent copies of a digital data;

the digital data containing an encrypted data main body, encrypted copy management information for controlling permission with regard to copying the data main body and key information for decrypting the data main body;

the device comprising:
  a determining section for determining if permission be granted for copying the digital data or not based on if the copy management information satisfies predetermined requirements or not; and
  a key altering section for altering the key information contained in the digital data when the determining section determines that permission should not be granted for copying the digital data.

According to a third aspect of the invention, there is provided a method to be used with digital data copying apparatus for preventing fraudulent copies of a digital data;

the digital data containing an encrypted data main body, encrypted copy management information for controlling permission with regard to copying the data main body and key information for decrypting the data main body;

the method comprising steps of:
  determining if permission be granted for copying the digital data or not based on if the copy management information satisfies predetermined requirements or not; and
  altering the key information contained in the digital data when the determining section determines that permission should not be granted for copying the digital data.

According to a fourth aspect of the invention, there is provided a method to be used with digital data copying apparatus for preventing fraudulent copies of a digital data comprising steps of:
  adding to the digital data copy management information containing generation management information to indicate the generation of the digital data as descendent of the original data and numerical management information to indicate the number of copies made from the digital data;
  prohibiting any operation of copying the digital data when the generation management information indicates a predetermined generation and the numerical management information indicates a predetermined number of copies.

According to a fifth aspect of the invention, there is provided a recording medium for storing data having a computer-readable data structure;

the data structure comprising:
  an encrypted data main body;
  encrypted copy management information for controlling permission with regard to copying the data main body;
  first key information for decrypting the data main body; and
  second key information for decrypting the copy management information.

According to a sixth aspect of the invention, there is provided a recording medium for storing data having a computer-readable data structure;

the data structure comprising:
  an encrypted data main body;
  first key information obtained by encrypting a data encryption key to be used for decrypting the data main body;
  a plurality of second key information obtained by encrypting the data encryption key by means of a plurality of encryption keys; and
  a plurality of third key information obtained by encrypting copy management information for controlling permission with regard to copying the data main body by means of the plurality of encryption keys.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated herein and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, the present invention will be described by referring to the accompanying drawing that illustrate preferred embodiments of the invention.

In the description of cryptic systems that follows, an encrypting operation is expressed by Ey(x), where x represents the data to be encrypted and y represents the encryption key to be used for the encrypting operation. On the other hand, a decrypting operation is expressed by Dy(z), where z represents the data to be decrypted and y represents the decryption key to be used for the decrypting operation. Thus, Ey(Dy(x))=x and Dy(Ey(x))=x.

In the illustrations of the embodiments, a broken dotted line indicates key information to be used for encryption or decryption and a solid line indicates information to be encrypted or decrypted.

1st Embodiment of the Invention

Figure 1:
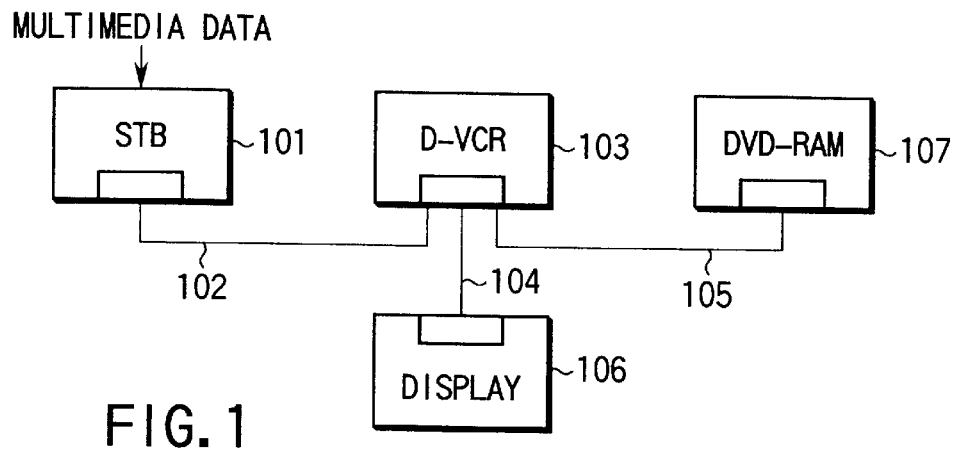
FIG. 1 is a schematic block diagram of a digital recording/reproducing apparatus to which a first embodiment of device for preventing fraudulent copies of a digital data according to the invention and which are connected with each other.

FIG. 1 is a schematic block diagram of a digital recording/reproducing apparatus to which a first embodiment of device for preventing fraudulent copies of a digital data according to the invention and which are connected with each other.

Referring to FIG. 1, multimedia information in the form of sounds/images/characters is distributed by way of a cable television network and, for example, transmitted to an STB (set top box) 101.

In the illustrated system, the STB 101 is connected to a digital VCR (D-VCR) 103 by way of an IEEE 1394 cable 102 and further connected to a display 106 and a DVD-RAM 107 by way of the digital VCR 103 and respective IEEE 1394 cables 104, 105. Since a plurality of digital recording/reproducing apparatus are connected with each other in the illustrated system, data can be transmitted among any of the apparatus for copying.

In the illustrated system, the STB 101, the digital VCR 103 or the DVD-RAM 107 are used as transmitter for transmitting data, whereas the digital VCR 103 or the DVD-RAM 107, whichever appropriate, is used as receiver for receiving data. Now, a method of preventing fraudulent copies from being produced between the transmitter and the receiver according to the invention will be described.

More specifically, the STB 101 is used to decipher (deshuffle) scrambled multimedia data and store/transmit billing data. The multimedia data input to the STB 101 is transmitted to the devices 103, 106, 107 by way of the respective IEEE 1394 cables 102, 104 and 105. IEEE 1394 refers to a high speed serial digital interface defined by the IEEE and adapted to high speed data transmission either in the asynchronous mode or in the isochronous mode. Thus, IEEE 1394 is popularly used for connecting personal computers, digital TVs, digital VCRs, DVD-RAMs and other digital AV equipment.

Now, a data structure that can be used for this embodiment of method of preventing fraudulent copies of data according to the invention will be described.

Figure 2:
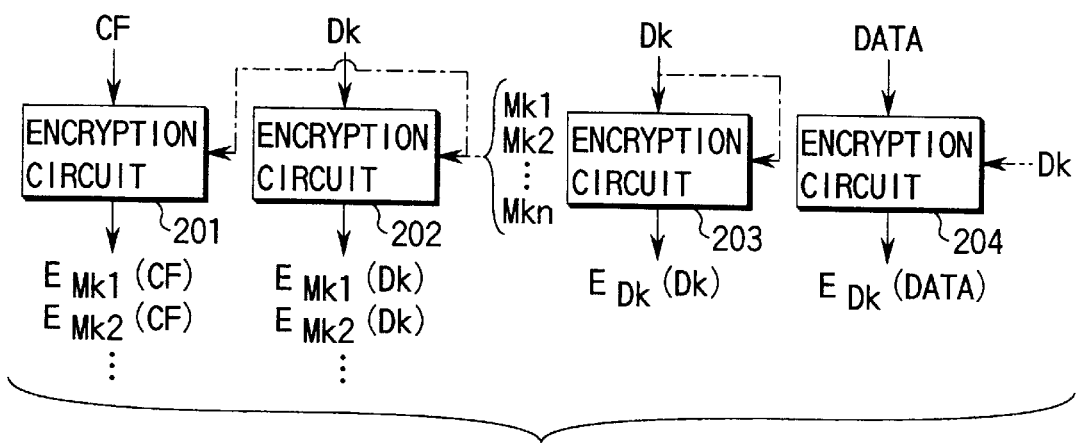
FIG. 2 is a schematic illustration showing how to configure a data structure to be used with the embodiment of FIG. 1.

FIG. 2 is a schematic illustration showing how to configure a data structure to be used with the embodiment.

The contents of the data stored in the DVD are encrypted by means of a title key or a disc key. Assume that the contents are encrypted in this embodiment by means of data encryption key Dk, which is referred to as disc key. FIG. 2 shows how the data is encrypted by the data encryption key Dk in the encryption circuit 204 to become EDk (data). The suppliers of the digital recording/reproducing apparatus would not be informed of the data encryption key Dk in advance.

In the digital recording/reproducing apparatus, said data encryption key Dk is encrypted and added as part of the data structure in order to reproduce the data that may be image data. As a matter of fact, encrypted data encryption keys Dk of two different types will be prepared. One is used to encrypt the data encryption key Dk by using itself as encryption key in the encryption circuit 203 to produce EDk (Dk). The other is encrypted by means of each master key of the master key bundle Mkn in the encryption circuit 202 to produce encrypted data EMk1 (Dk), EMk2 (Dk), ..., EMkn (Dk), the number of which is equal to the number of keys of the key bundle.

The master key bundle Mkn is controlled typically by a key management firm and the suppliers of the digital recording/reproducing apparatus are provided by the key management firm with a master key bundle Mks that is part of the master key bundle Mkn. The master key bundle Mks comprises a plurality of master keys, which are different from supplier to supplier so that the keys may be controlled effectively. Since each of the suppliers possess at least part of the master keys Mk1, Mk2, ..., Mkn, he or she can take out data encryption key Dk safely and reliably if the data structure contains encrypted data EMk1 (Dk), EMk2 (Dk), ..., EMkn (Dk) and EDK (Dk). The technique to be used for taking out the data encryption key Dk will be described in detail hereinafter.

Additionally, according to the invention, the data structure is made to contain encrypted copy management flag CF to securely control the operation of copying data. Referring to FIG. 2, the copy management flag CF is encrypted by the master key bundle Mkn in the encryption circuit 201 to produce a string of encrypted data EMK1 (CF), EMk2 (CF), ..., EMkn (CF).

Figure 3:
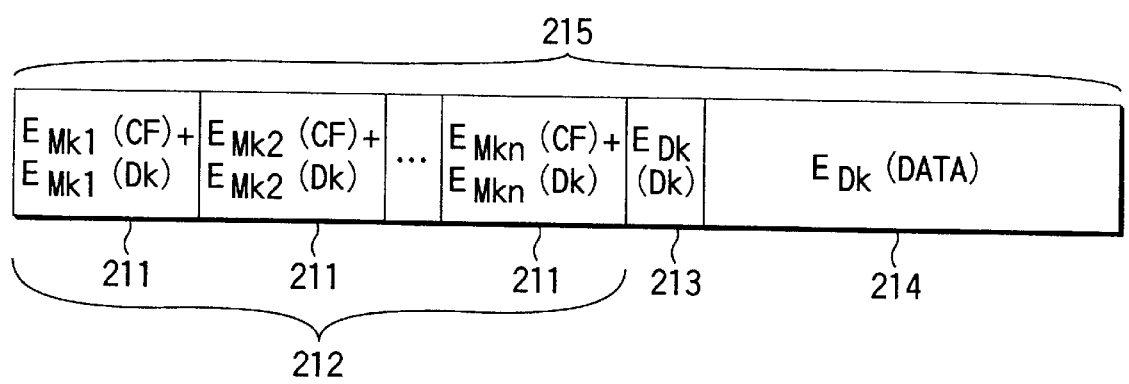
FIG. 3 is a schematic illustration of a data structure applicable to the embodiment of device for preventing fraudulent copies in FIG. 1.

FIG. 3 is a schematic illustration of a data structure applicable to the embodiment of device for preventing fraudulent copies.

It will be seen from FIG. 3 that the encrypted data described above by referring to FIG. 2 are combined to form a data structure. Pairs 211 of a copy management flag CF and a data encryption key Dk are arranged in line to form a master key encrypting section 212 and a disc key encrypting section 213 that is EDk (Dk) is added to the tail of the master key encrypting section 212. Then, the data main body 214 that is EDk (data) is arranged at the rear end of the disc key encrypting section 212 to produce a complete data structure 215.

As described earlier, the data main body 214 contains data obtained by encrypting data on digitized documents, sounds, images and/or programs and the data structure 215 formed by adding data encryption key Dk and copy management flag CF to the data main body 214 is processed or unprocessed before it is temporarily stored in the DVD-RAM 107 or the D-VCR and then transmitted to the STB 101 typically by way of a communication network. Thus, the data structure 215 is used for transmission and recorded on a recording medium. Then, copies of the data structure 215 carried by a recording medium are distributed and sold to users.

According to the invention, the CF, or the copy management flag CF that has been encrypted and protected against illegal external access and is contained in the data structure, is utilized for copy management (generation management, management of the number of copies) with regard to the data to prevent any effective reproduction of fraudulently copied data.

Now, the operation of reproducing and copying data in a digital recording/reproducing apparatus adapted to use a data structure 215 having a configuration as described above will be discussed.

Figure 4:
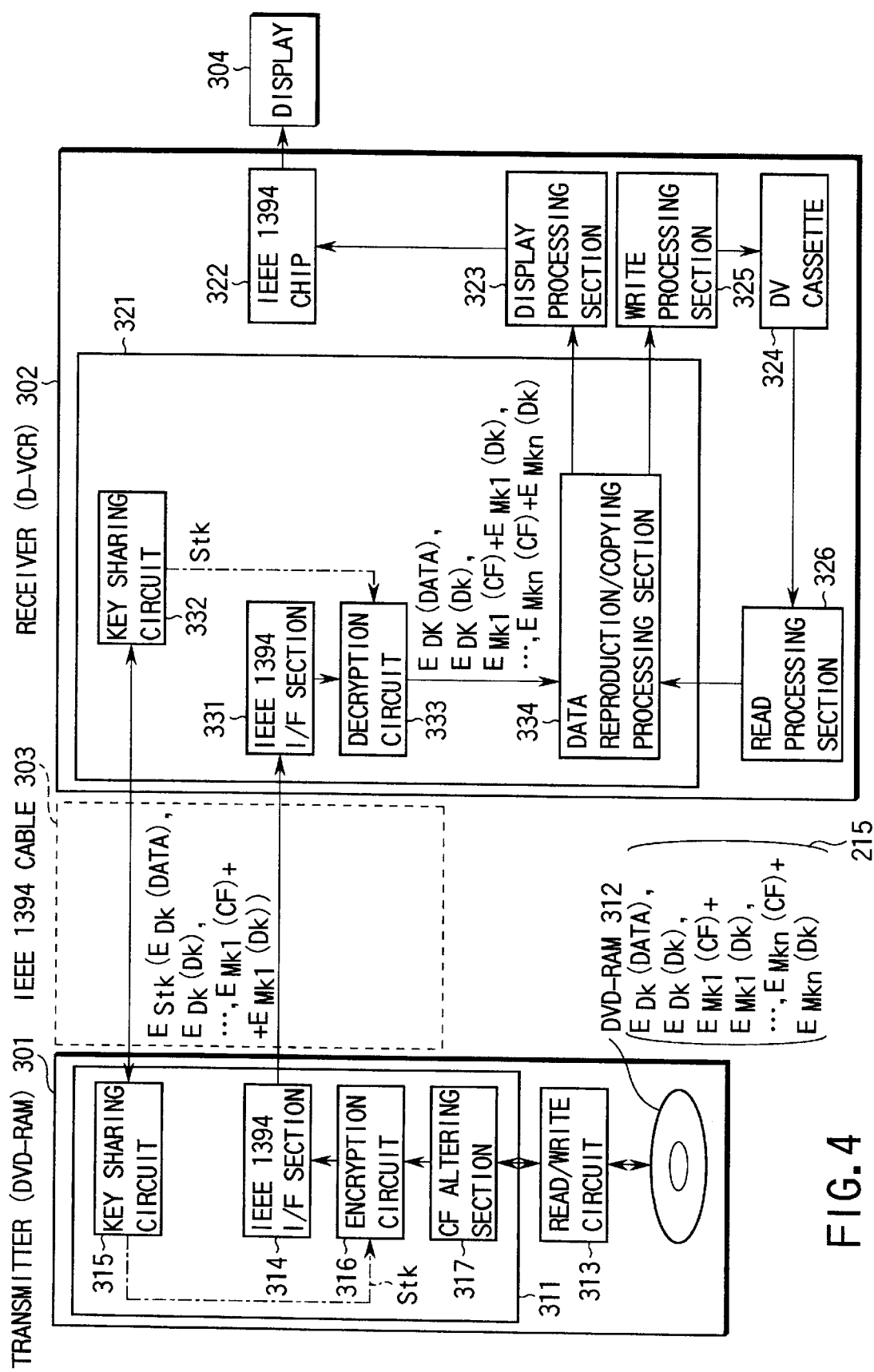
FIG. 4 is a schematic block diagram of a digital recording/reproducing apparatus to which the embodiment of device for preventing fraudulent copies in FIG. 1 is applied.

FIG. 4 is a schematic block diagram of a digital recording/reproducing apparatus to which the above embodiment of device for preventing fraudulent copies is applied.

Referring to FIG. 4, a DVD-RAM is used for transmitter 301 and D-VCR is used for receiver 302, which transmitter 301 and receiver 302 are connected with each other by way of an IEEE 1394 cable 303. While the transmitter 301 and the receiver 302 are exclusively used for data transmission and data reception respectively in the following description for the purpose of simplification, it may be appreciated that each of them may operates both as transmitter and receiver. It may also be appreciated from FIG. 1 that the transmitter 301 and the receiver 302 may be realized in many different ways by appropriately combining various componental devices.

The transmitter 301 comprises an IEEE 1394 chip 311 and a read/write circuit 313 for reading data stored in the form of a data structure 215 from DVD-RAM 312 and write data. The IEEE 1394 chip 311 has an IEEE 1394 I/F section 314 for performing IEEE 1394 interface operations to communicate with the receiver 302, a key sharing circuit 315, an encryption circuit 316 and a CF altering section 317.

On the other hand, the receiver 302 comprises IEEE 1394 chips 321, 322, a display processing section 323 for processing the reproduced data, regulating the image quality and other factors and displaying the data on display 304, a write processing section 325 for storing the data structure 215 output from data reproduction/copying processing section 334 of the IEEE 1394 chip 321 in DV cassette 324 and a read processing section 326 for reading the data structure 215 from the DV cassette 324 and inputting it into the data reproduction/copying processing section 334. The IEEE 1394 chip 321 comprises an IEEE 1394 I/F section 331 for performing IEEE 1394 interface operations to communicate with the transmitter 301, a key sharing circuit 332, a decryption circuit 333 and a data reproduction/copying processing section 334.

Of the above components, the key sharing circuits 315, 332, the encryption circuit 316 and the decryption circuit 333 are used to encrypt the data structure 215 when transmitting it by way of the IEEE 1394 cable 303.

The key sharing circuits 315, 332 are adapted to securely share the temporary key Stk by the information transmitted through the IEEE 1394 cable 303. The encryption circuit 316 encrypts the DVD-RAM data (the data structure 215) output from the CF altering section 317 by means of the temporary key Stk from the key sharing circuit 315. The decryption circuit 333 decrypts the encrypted data structure 215 received from the IEEE 1394 I/F section 331 by means of the temporary key Stk form the key sharing circuit 332 and delivers it to the data reproduction/copying processing section 334. The method of sharing the temporary key Stk will also be discussed in detail by referring to the fourth and fifth embodiments of the invention.

The CF altering section 317 of the transmitter 301 delivers the data structure 215 read out on the read/write circuit 313 to the encryption circuit 316 and alters the copy management flag CF. Then, the CF altering section 317 updates the same data structure 215 stored in the DVD-RAM 312, using the new data structure 215 obtained by altering the CF.

The data reproduction/copying processing section 334 of the receiver 302 deciphers the data structure 215 received from the decryption circuit 333 or the read processing section 326 by means of the key bundle Mks it has and takes out the data encryption key Dk and the copy management flag CF. Then, the data reproduction/copying processing section 334 outputs the decrypted data to the display processing section 323 and, after altering the copy management flag CF, prepares a new data structure 215, using its own master key bundle Mks, which is then output to the write processing section 325 as data to be preserved (copy data).

Now, the operation of the embodiment of device for preventing fraudulent copies of data according to the invention and having the above described configuration will be described.

When a data is to be transferred, the transmitter 301 and the receiver 302 firstly share the temporary key Stk by means of the key sharing circuits 315, 332.

Then, the data structure 215 stored in the DVD-RAM 312 is read out and input to the encryption circuit 316 by way of the CF altering section 317, where it is encrypted by means of the temporary key Stk. Then, the encrypted data structure 215 is transmitted to the receiver 302 over the IEEE 1394 cable 303 by the IEEE 1394 I/F section 314.

Meanwhile, the copy management flag CF is altered by the CF altering section 317.

Figure 5:
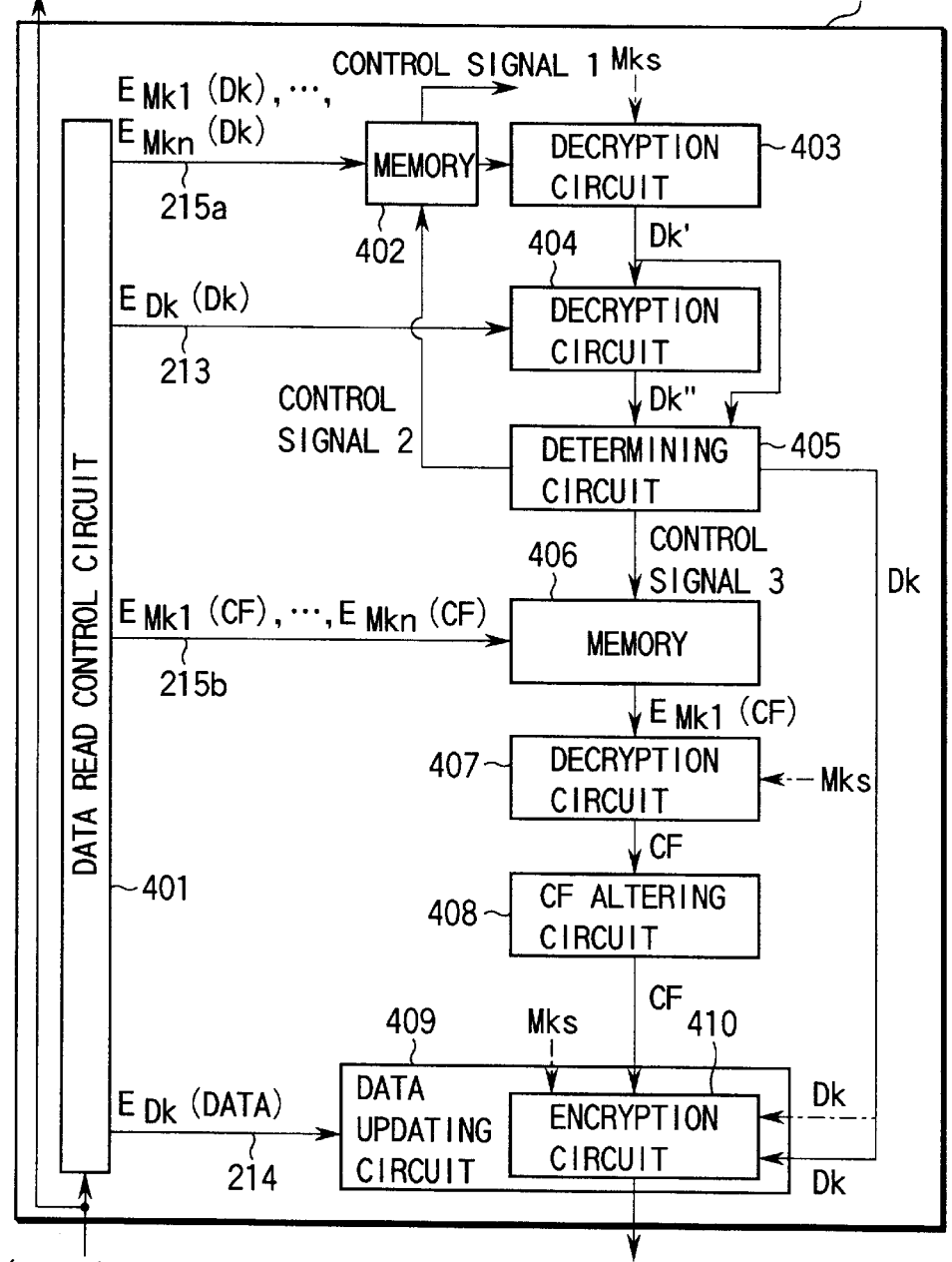
FIG. 5 is a schematic block diagram of the CF altering section of the embodiment of FIG. 1, illustrating its operation.

FIG. 5 is a schematic block diagram of the CF altering section of the above embodiment, illustrating its operation.

Referring to FIG. 5, the data structure 215 read from the DVD-RAM 312 is sent to the encryption circuit 316 and also input to data read control circuit 401.

The data read control circuit 401 is adapted to divide the received data structure 215 into:

EMk1 (Dk), EMk2 (Dk), ..., Emkn (Dk) ... 215a,
EMk1 (CF), EMk2 (CF), ..., EMkn (CF) ... 215b,
EDk (Dk); disc key encrypting section ... 213 and
EDk (data); data main body ... 214. All the components except EDk (data) have a fixed length and hence it is easy to separate the header from the rest of each component as shown in FIG. 3.

The data encryption keys 215a encrypted by using keys of the master key bundle Mkn or Mks as encryption keys are part of the master key encrypting section 212 of FIG. 3 and hence stored in an area where the users of the IEEE 1394 chips cannot arbitrarily take it out. The data encryption keys 215a encrypted by the master key bundle is then decrypted by sequentially using the keys of the master key bundle Mks provided to the suppliers of the apparatus as decryption keys.

Note that EMk1 (Dk), EMk2 (Dk), ..., EMkn (Dk) 215a are temporarily taken into memory 402 and then sequentially decrypted typically from EMk1 (Dk) on in the decryption circuit 403 as the keys of the master key bundle Mks in the IEEE 1394 chips are sequentially taken out by control signal 1 and used as decryption keys.

Then, Dk' obtained by the decryption is used as decryption key to decrypt EDk (Dk) in the decryption circuit 404 and obtain Dk". Then, Dk' and Dk" are compared by determining circuit 405. If Dk'=Dk", it indicates that the master key used for encrypting the data encryption key is identical with the master key used for decrypting the encrypted data encryption key. If, however Dk'≠Dk", it indicates that the master key used for encrypting the data encryption key is different from the master key used for decrypting the encrypted data encryption key. If Dk'≠Dk" holds true for all the master keys, it signifies that the crypt, EMk1 (Dk) for example, cannot be decrypted by the master key bundle Mks possessed by the chip.

If such is the case, then control signal 2 calls EMk2 (Dk) located next to EMk1 (Dk) in the memory 402 and the above processing operation is repeated by using the master key bundle Mks in the IEEE 1394 chip. In this way, the processing operation will be repeated until EMki that makes Dk'=Dk" is found.

When Dk'=Dk" is achieved, it indicates that the data encryption key Dk is taken out from EMki (Dk) by means of the current master key. Then, EMki (CF) is taken out of EMk1 (CF), EMk2 (CF), . . . , EMkn (CF) stored in the memory 406 by control signal 3. It is easy to identify EMki (CF) because the copy management flags CF encrypted by the master key bundle are arranged in the order starting from 1 and terminating by n (or s) just as the data encryption keys 215a encrypted by the master key bundle.

Then, CF is obtained by decrypting EMki (CF) by means of the master key identified by the decryption circuit 407. Then, the copy management flag CF is altered by the CF altering circuit 408 and input to the encryption circuit 410 of data altering circuit 409.

The data altering circuit 409 is adapted to receive EDk (data), or the data main body 214 of the data structure 215, from the data read control circuit and also Dk, or the altered CF, which is then encrypted by the master key bundle Mks and the data encryption key Dk in encryption circuit 410 and added to the data main body 214 as header.

The data structure 215 (having a structure same as that of FIG. 3 except that Mkn is replaced by Mks) containing copy management flags CF encrypted by the master key bundle Mks specific to the apparatus supplier and altered is then output to the read/write circuit 313 and the corresponding part of the DVD-RAM 312 is updated by this new data structure 215.

Note that a copy management flag CF comprises generation management information and numerical management information to indicate the number of copies. Generation management refers to an activity of controlling the operation of copying the master disc, then copying the produced copy and so on. On the other hand, numerical management for the number of copies refers to an activity of controlling the number of copies made by a data structure. As for a data structure 215 delivered to the encryption circuit 316, passing through the CF altering section 317, the encryption circuit 316 will be responsible for generation management. As for a data structure 215 returned to the DVD-RAM 312 and updated by the CF altering section 317, on the other hand, the CF altering section 408 counts up the number of copies but would not do anything about generation management. When the count gets to the largest possible number, the receiver 302 can no longer properly copy the data.

Thus, the transmitter 301 is charged with the task of generation management, while the receiver 302 is also responsible for controlling the received data structure 215 for copying. Now, the processing operation of the receiver will be discussed below.

Firstly, the encrypted data structure is received by the IEEE 1394 I/F section 331 of the receiver 302 and decrypted by the decryption circuit 333, using the temporary key Stk provided by the key sharing circuit 332 before input to the data reproduction/copying processing section 334.

Figure 6:
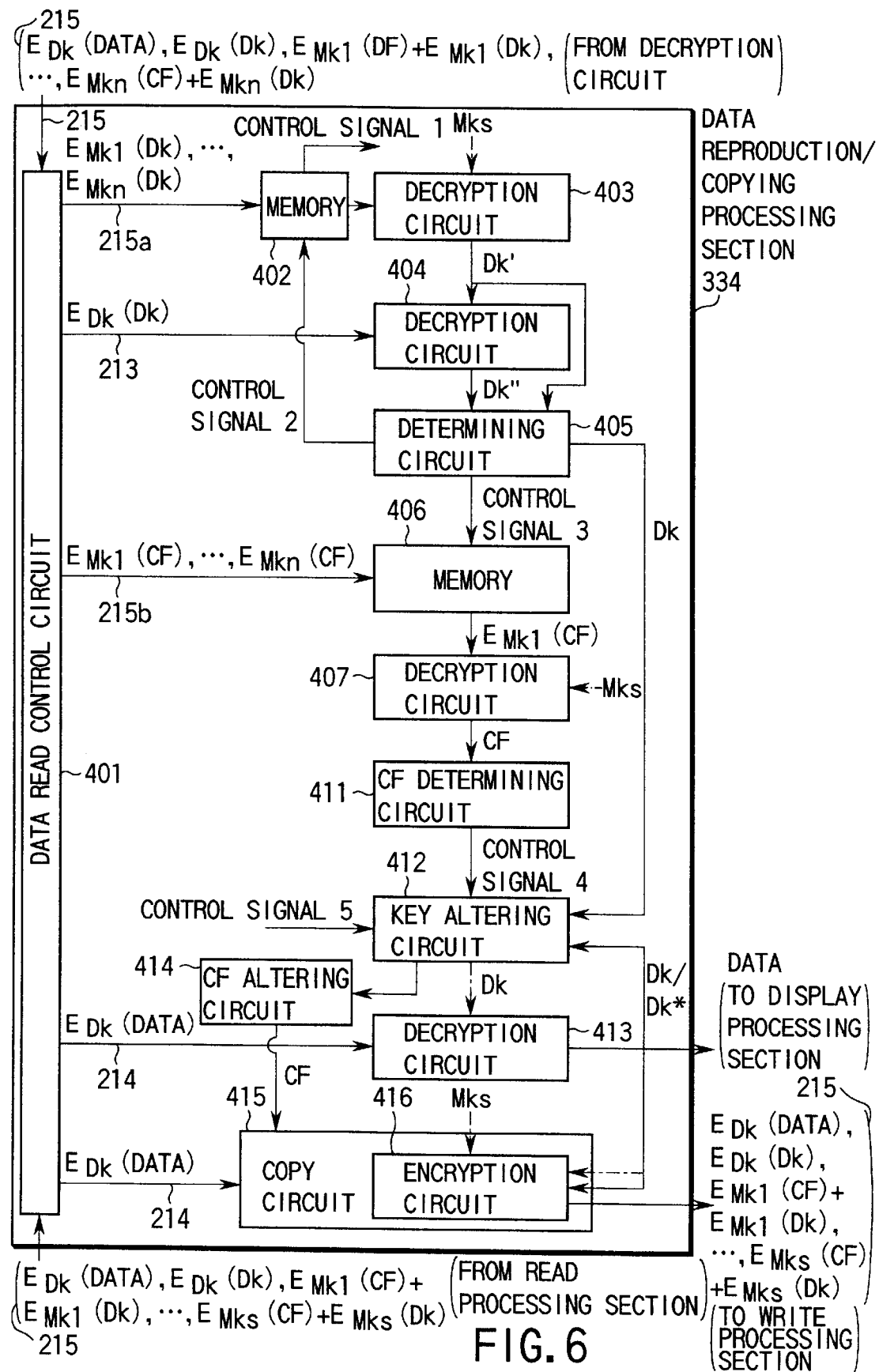
FIG. 6 is a schematic block diagram of the data reproduction/copying processing section, illustrating its operation.

FIG. 6 is a schematic block diagram of the data reproduction/copying processing section, illustrating its operation. Note that the components same as those of FIG. 5 are denoted respectively by the same reference symbols.

The data structure 215 to be input to the data reproduction/copying processing section 334 is firstly input to the data read control circuit 401, which divides it into components as in the case of the CF altering section 317 in FIG. 5. Note that the processing steps down to the step where the data encryption key DK is taken out by the determining circuit 405 and the copy management flags CF is taken out by the decryption circuit 407 are identical with the respective corresponding steps as described above by referring to the CF altering section 317 in FIG. 5.

Thereafter, the status of the taken out copy management flag CF is determined by the CF determining circuit 411. The function of the copy management flag CF for generation management and numerical management for copies will be discussed in detail hereinafter. The CF determining circuit determines if the copy management flag CF indicates that a copy can be made for the next generation or not and, if a copy can be made for the next generation, it determines if the largest possible number has been reached for copying or not to decide if it is permitted to copy the data structure or not. Then, the copy management flag CF and the result of the decision on the permissibility for copying (control signal 4) of the CF determining circuit 411 are given to key altering circuit 412.

Upon receiving a control signal 5 indicating that a recording command and/or a reproduction command are entered by the user, the key altering circuit 412 outputs the copy management flag CF and the data encryption key Dk given to it in advance without or after altering it.

For reproducing data and simply displaying it on the display 304, EDk (data) which is the data main body 214 of the data structure 215 is decrypted by the decryption circuit 413 before it is taken out and output to the display processing section 323. At this time, the data encryption key Dk taken out by the determining circuit 405 is always given from the key altering circuit 412 to the decryption circuit 413 as decryption key. Therefore, as long as a normal data encryption key Dk is taken out, the operation of data reproduction is performed properly regardless of the status of the copy management flag CF.

For copying data on the DV cassette 314, on the other hand, the processing operation to be performed varies depending on the outcome of the decision of the CF determining circuit 411.

Firstly, assume that the copy management flag CF is in a status that permits copying. Then, a copy management flag CF is input from the key altering circuit 412 to CF altering circuit 414, while the data encryption key Dk is input to the encryption circuit 416 of copy circuit 415 as data to be encrypted and also as encryption key.

The CF altering circuit 414 operates for a generation shift. More specifically, the generation management information of the copy management flag CF is modified to identify the data structure as that of the next generation. The modified copy management flag CF is then input to the copy circuit 415.

Thus, EDk (data) is input from the data read control circuit 401 to the copy circuit 415 as data main body of the data structure along with Dk and the modified CF. In the encryption circuit 416, Dk and CF are encrypted by the master key bundle Mks and the data encryption key Dk and added to the data main body 214 as header.

Then, the data structure 215 encrypted by the master key bundle Mks specific to the apparatus supplier and provided with the altered copy management flag CF (said data structure 215 being same as the one shown in FIG. 3 except that Mkn is changed to Mks) is output to the write processing section 325 and stored in the DV cassette 324 as copy data. Since the master key bundle Mkn is altered to Mks by the copying operation, the stored data structure 215 is no longer interchangeable among apparatus suppliers and hence cannot be reproduced nor copied by means of an apparatus having no master key bundle Mks.

For reproducing the stored data structure 215, the data structure 215 that is encrypted by means of the master key bundle Mks is input from the read processing section 326 to the data read control circuit 401 and processed in a manner as described above.

Now, assume that the copy management flag CF is in a status that does not permit copying. Then, the copy management flag CF is not altered at all in the CF altering circuit 414 because the data structure 215 can no longer be copied. On the other hand, the key altering circuit 412 outputs a data encryption key different from the one output in a status that permits copying to the encryption circuit 416.

More specifically, in a status that does not permit copying, the key altering circuit 412 inputs a fake data encryption key Dk* that is different from the proper data encryption key Dk taken out in the determining circuit 405 to the encryption circuit 215 as data encryption key that is to be encrypted as data and also to be used as encryption key. Dk may be altered to produce a fake data encryption key Dk* by inverting the bits of Dk, by shifting the bits or by determining the exclusive logical OR of it and a specific value.

The operation of the copy circuit 415 and that of the encryption circuit 416 performed when a data is given to them are identical with the above described operations. However, as for the data structure 215 generated by this circuit 415 and stored, the encryption key of EDk (data) remains to be Dk as shown in FIG. 3, whereas all the data encryption keys Dk* used by the master key encrypting section 212 and the disc key encrypting section 213 that operate as header and stored will be fake keys. Therefore, when trying to decrypt the data structure 215, the fake data encryption key Dk* are taken out and hence random data reproduction will occur.

The above description applied to an effort for copying the data structure 215 from the transmitter 301 to the receiver 302 and reproducing the data. Thus, the number of copies made from the original data is controlled by the transmitter 301 and the generation management for controlling the operation of copying a copied data will be carried out by the receiver 302.

Figure 7:
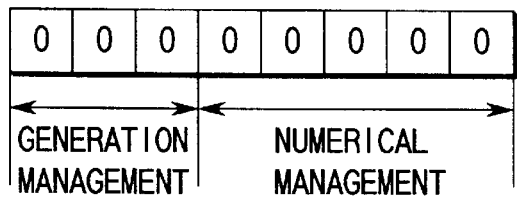
FIG. 7 is a schematic illustration of the configuration of copy management flag CF.
Figure 8:
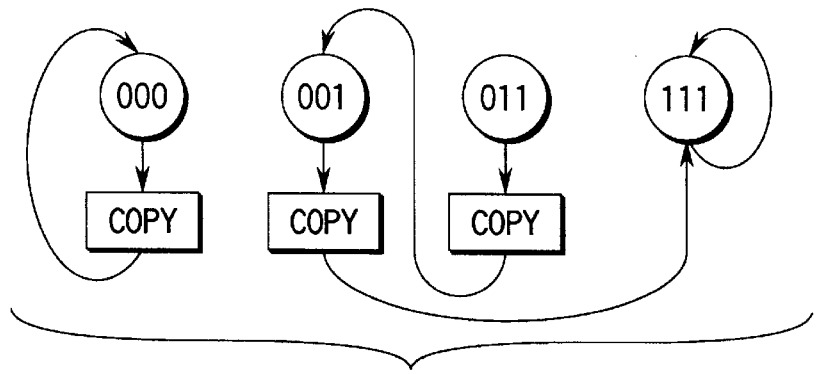
FIG. 8 is a schematic illustration showing how the state of the copy generation management bits changes.

Now, the copy management flag CF and the operation of controlling copy generations and the number of copies will be specifically described by referring to FIGS. 7 and 8.

FIG. 7 is a schematic illustration of the configuration of copy management flag CF. Note that, in this embodiment, a byte comprises eight bits and the upper three bits are used for controlling copy generations (generation management information) and the lower five bits are used for controlling the number of copies (numerical management information relating to the number of copies).

FIG. 8 is a schematic illustration showing how the state of the copy generation management bits changes. The upper three bits are used as shown below for controlling copy generations.

000 . . . copy permitted

001 . . . 1st generation copy permitted (2nd generation copy prohibited)

→ The 1st generation copy will be indicated by 111.

011 . . . 2nd generation copy permitted (3rd generation copy prohibited)

→ The 1st generation copy will be indicated by 001 and the 2nd generation copy will be indicated by 111.

111 . . . copy prohibited

Thus, as shown in FIG. 8, if the upper three bits for controlling copy generations are all "0s", those of any copy will remain to be all "0s". However, if they are "001" to indicate that the first generation copy is permitted but the second generation copy is prohibited, the bits for controlling copy generations are turned to "111" to prohibit the second generation copy once the original is copied. If, on the other hand, the upper three bits for controlling copy generations are "011" to indicate that the second generation copy is permitted but the third generation copy is prohibited, the bits for controlling copy generations of the first generation copy are turned to "001" to permit the second generation copy and those of the second generation copy are turned to "111" to prohibit the third generation copy. Thus, copy generations are controlled in this way.

As for the number of copies, when the number of copies gets to a predetermined limit number, no further copies will be permitted regardless of the values of the three bits for controlling copy generations. While the permitted largest number of copies will be 32 in this embodiment because the lower five bits are used for limiting the number of copies, a larger number may be assigned as the largest number of copies by increasing the number of bits that can be used for controlling the number of copies.

For instance, this feature of controlling the number of copies may be advantageously used to limit the number of users of a master disc that stores software. The copy made by a user may be prevented from being copied further if the copy generation management flag of the master disc is set to "001" to allow only the first generation copy.

Then, the bits to be used for controlling the number of copies represents the number of users who are authorized to copy the software stored in the master disc. In this embodiment, the number authorized users will be between 0 and 32.

Assume here that ten users are authorized to copy the software stored in the master disc. Then, the bits for the largest number of permitted copies will be "01010". When a user has made a copy, CF of the master disc and that of the user will be altered to become as shown below.

| | |
|---|---|
| CF of the master disc: | 00101001 |
| CF of the user: | 11100000 |

Thus, the software obtained by the user by copying the original can no longer be recorded on any other recording medium.

When all the ten authorized users have made respective copies of the software, CF of the mater disc will be altered to become as shown below.

CF of the master disc: 00100000

Thus, while the first generation copy is still permitted to take place, no further copy is possible because zero copy is permitted to make.

Alternatively, the copy generation management bits of the master disc may be turned to "111" when the last authorized user made a copy.

As described above, with the embodiment of device for preventing fraudulent copies, a copy management flag CF to be used for controlling copies is encrypted and contained in the data structure 215 so that any attempt to alter the copy management flag CF and fraudulently copy the data structure on the way of transmission can be prevented for succeeding and any illegal access to the data structure can be eliminated effectively and reliably to securely protect the copyright.

Additionally, the data reproduction/copying processing section 334 comprises a CF determining circuit 411 and a key altering circuit 412 so that, if there is an attempt for copying a data structure that is not permitted to be copied, the data encryption key is automatically altered to make it impossible to effectively reproduce the fraudulently copied data. In other words, if it is determined that copying a digital data is prohibited, the key information contained in the digital data is altered so that any copy of the digital data cannot effectively be reproduced. This arrangement provides the effect of prohibiting any attempt for fraudulently copying a digital data.

The CF altering section 317 is used to count up the number of copies made from the data structure by counting the number of times of data transmission. Thus, the data copying operation can be controlled in an elaborate manner.

The data reproduction/copying processing section 334 comprises a CF determining circuit 411 and a CF altering circuit 414 to update the data structure to be copied so that the data copying operation can be further controlled in an elaborate manner.

Additionally, the data structure to be transmitted is encrypted by means of the key sharing circuits 315, 332 and the encryption circuit 316 so that the data structure cannot be utilized by the receiving party if the latter is not provided with an decryption circuit 333. Furthermore, data are encrypted by means of a temporary encryption key before they are transmitted between the apparatus located at the opposite ends of the line so that they are protected against being fraudulently copied on to some other recording medium from the cable connecting the apparatus.

Still furthermore, the copy management flag CF to be used for indicating if making a copy is permitted or not has a function of controlling copy generations and that of controlling the number of copies, copies can be controlled in an elaborate fashion.

While the CF altering section 317 and the data reproduction/copying section 334 are contained respectively in the IEEE 1394 chips 311 and 321 in the above embodiment, the present invention is not limited thereto and the CF altering section 317 and the data reproduction/copying section 334 may be realized in the form of independent chips.

2nd Embodiment of the Invention

A different data structure will be used in this embodiment to prevent fraudulent copies of data.

Figure 9:
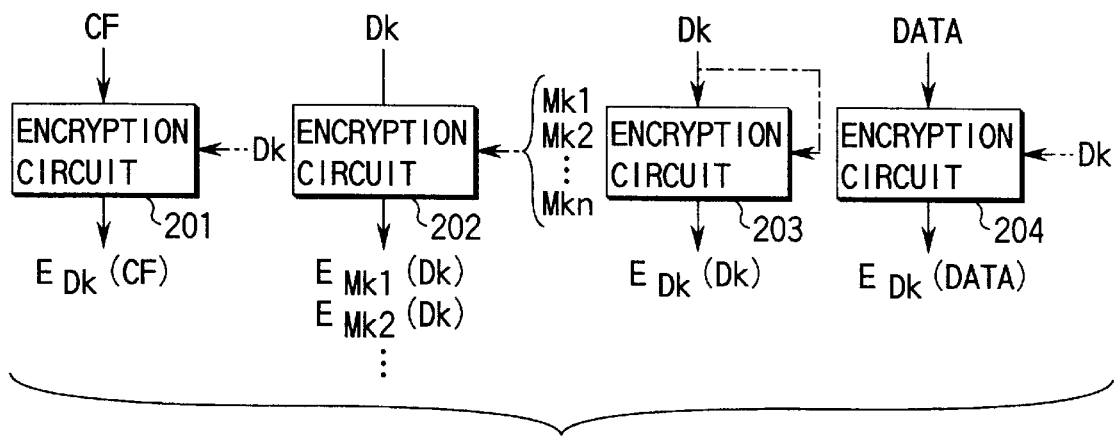
FIG. 9 is a schematic illustration showing how to configure a data structure to be used with a second embodiment of the invention.

FIG. 9 is a schematic illustration showing how to configure a data structure to be used with the second embodiment. Note that the elements in FIG. 9 that are identical with their counterparts of FIG. 2 will be denoted respectively by the same reference symbols and will not be described here any further.

The data encrypting procedures of the second embodiment is identical with that of the first embodiment except that data encryption key Dk is used as encryption key for encrypting the copy management flag CF. Note that, while a plurality of encrypted data are used for CF in the embodiment of FIG. 2 because the master key bundle is utilized there, only a single encrypted data is used in this embodiment because data encryption key Dk is employed in this embodiment.

Figure 10:
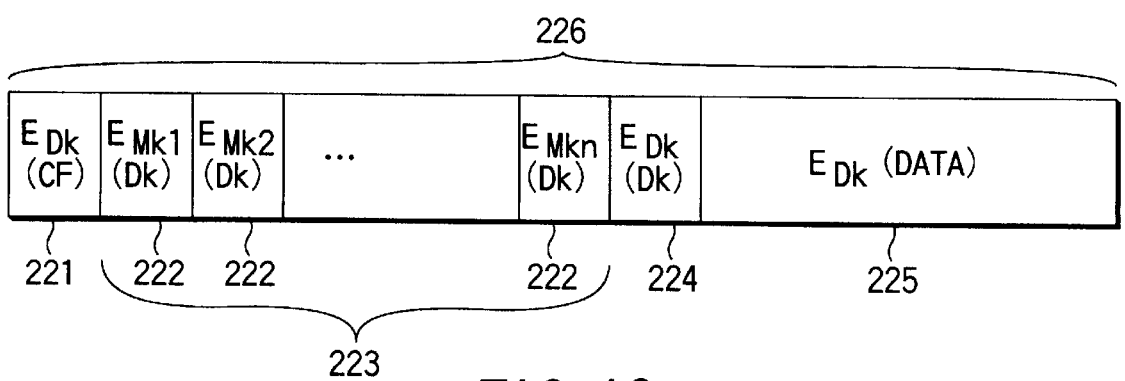
FIG. 10 is a schematic illustration of another data structure applicable to the second embodiment of device for preventing fraudulent copies.

FIG. 10 is a schematic illustration of sill another data structure that can be used with the second embodiment of device for preventing fraudulent copies.

In FIG. 10, the encrypted data shown in FIG. 9 are combined to form a data structure. The data structure 226 comprises a copy management flag section 221 encrypted by the data encryption key Dk, a master key encrypting section 223 containing data encryption keys 222 that are encrypted by the master key and arranged sequentially and a disc key encrypting section 224, which is EDk (Dk), to form a header for the data structure 226 and the data main body 225, which is EDk (data), takes the lead in the header.

Then, the data structure 226 having the above configuration is used as data to be recorded and reproduced by digital recording/reproducing apparatus provided with a device for preventing fraudulent copies in order to effectively control copies of the data and prevent fraudulent copies from being made.

The second embodiment is also applicable to digital recording/reproducing apparatus as described above by referring to the first embodiment. Thus, although part of the components of the data structure 226 divided by the data read control circuit is modified and Dk is used as key for encrypting and decrypting CF, the data structure 226 can be used with any apparatus shown in FIGS. 1, 4, 5 and 6.

Figure 11:
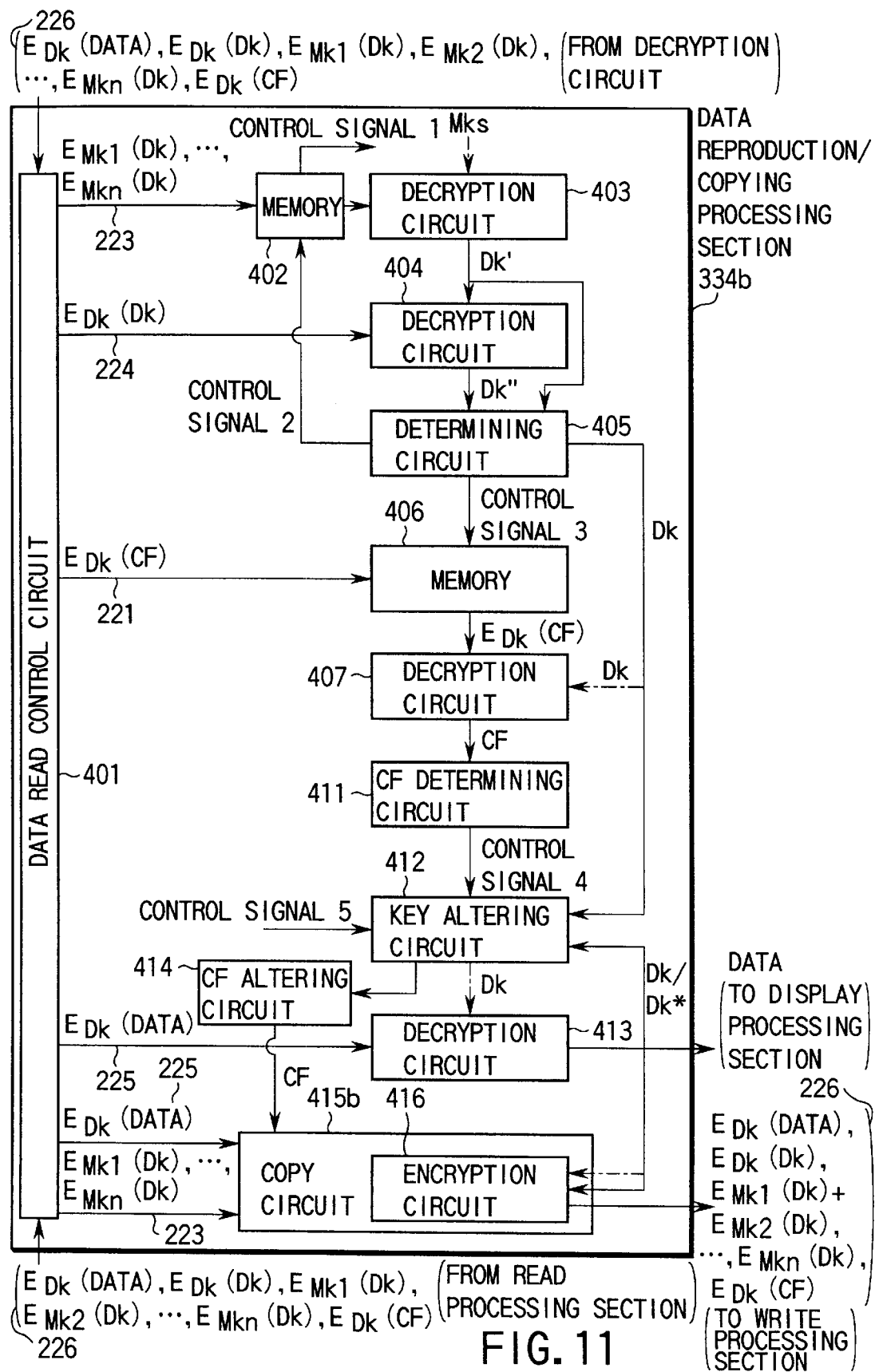
FIG. 11 is a schematic block diagram of the data reproduction/copying processing section of the second embodiment of device for preventing fraudulent copies, illustrating its operation.

FIG. 11 schematically shows the configuration of the data reproduction/copying processing section 334b adapted to the data structure 226. Note that the configuration resembles to that of FIG. 6.

FIG. 11 is a schematic block diagram of the data reproduction/copying processing section of the second embodiment. In FIG. 11, the components that are same as those of FIG. 6 are denoted respectively by the same reference symbols. Note that the entire system comprising the second embodiment of device for preventing fraudulent copies is identical with that of FIG. 4.

Referring to FIG. 11, this embodiment differs from the first embodiment (FIG. 6) in that, in this embodiment, the data structure 226 is entered to the data read control circuit 401 and divided so that EDk (CF) is entered to the memory 406 and the master key encrypting section 223 is input to the copy circuit 415b along with the data main body 225, that the decryption key to be used in the decryption circuit 407 is the data encryption key Dk obtained by the deter-mining circuit 405 and that the copy circuit 415b produces not the data structure 215 but the data structure 226 out of the inputs from the related sections. Note that the master key encrypting section 223 input from the data read control circuit 401 is utilized as part of the header of the data structure 226 in the copy circuit 415b. If Dk is altered to Dk* under the condition where no copy is permitted to be made, the data encryption key Dk would not be taken out from the master key encrypting section 223 of the data structure because it is different from Dk* of the new disc encrypting section 224 that becomes EDK* (Dk*).

As a result, the data structure 226 output from the copy circuit 416 is same as the data structure 226 input to the data reproduction/copying processing section 334b except that CF is altered and DK* is produced in a fraudulent copy. In particular, since the master key encrypting section 223 is not replaced by the master key bundle Mks that is specific to the supplier of the apparatus, the copied data remain interchangeable among the apparatus suppliers.

Note that the CF altering section of the transmitter used in this embodiment is obtained by altering the CF altering section 317 of FIG. 5 in a manner as described above by referring to FIGS. 6 through 11 (not shown). In other words, the data encryption key Dk is input to the decryption circuit 407 as decryption key and the master key encrypting section 223 is entered to the data altering section 409 and utilized in the header of the data structure 226 at the time of updating. Thus, the data structure 226 remains interchangeable among the apparatus suppliers when the number of copies is controlled.

As described above, since a data structure 226 is used with this embodiment of device for preventing fraudulent copies having a configuration similar to that of the first embodiment, it provides the advantages as listed above by referring to the first embodiment and, additionally, it maintains the data encryption key encrypted by the first master key Mkn for copying data so that the copied data and the original data can remain interchangeable among the apparatus suppliers.

3rd Embodiment of the Invention

While only data structures 215 as illustrated in FIG. 3 and data structures 226 as illustrated in FIG. 10 are applicable to the respective systems of the first and second embodiments, the third embodiment is adapted to be used with any of such data structures.

Figure 12A:
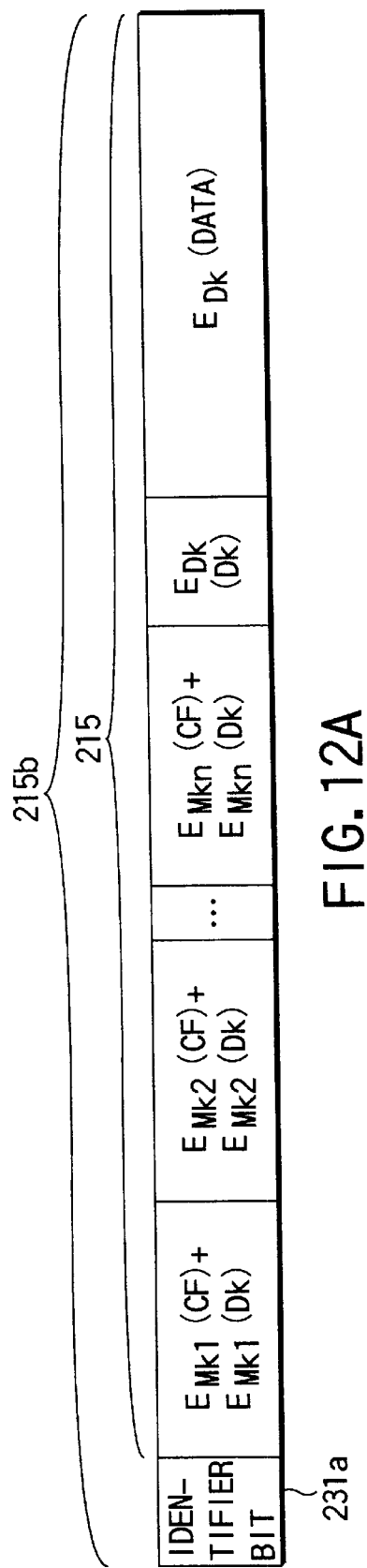
FIGS. 12A and 12B are schematic illustrations of two different data structures applicable to a third embodiment of device for preventing fraudulent copies.
Figure 12B:
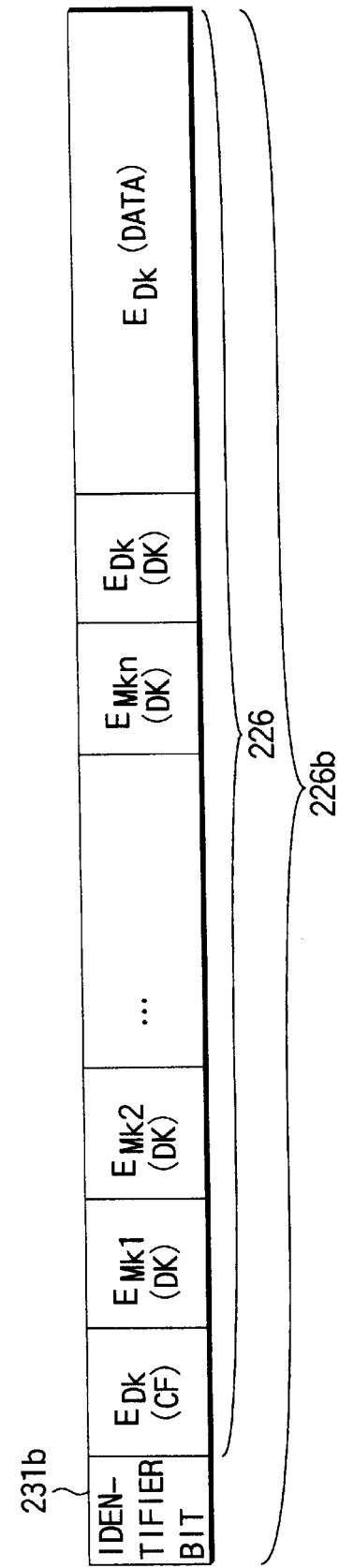

FIGS. 12A and 12B are schematic illustrations of two different data structures applicable to the third embodiment of device for preventing fraudulent copies.

The data structure 215b of FIG. 12A is obtained by adding an identifier bit 231a to the top of the data structure 215.

On the other hand, the data structure 226b of FIG. 12B is obtained by adding an identifier bit 231b to the top of the data structure 226.

The data read control circuit 401 of the data reproduction/copying processing section 334 or 334b, whichever appropriate, and the CF altering section 317 (including that of the second embodiment) of the third embodiment reads the identifier bit 231a or 231b, whichever appropriate, and outputs a control signal to the related sections showing the processing operation to be performed on the data structure.

As described above, both the data structure 215b and the data structure 226b can be used as digital data for the third embodiment of device for preventing fraudulent copies configured like the first and second embodiments so that the third embodiment provides the advantages of the first and second embodiments and, additionally, is adapted to data structures having different formats.

4th Embodiment of the Invention

The configurations of data structures and modes of controlling data copies by means of the copy management flag CF contained in the structure are described above by referring to the preceding embodiments. However, a data structure can be fraudulently copied on the data transmission path however rigorously data copies are controlled by any of the above described modes to nullify the effects of the above embodiments. This is the reason for arranging the key sharing circuits 315, 332 in the above embodiments so that the apparatus at the opposite ends of the line share temporary key Stk and the data encrypted by the temporary key Stk is transmitted through the transmission path (an IEEE 1394 cable 303).

The method of sharing temporary key Stk will be described by referring to the fifth embodiment. Thus, it should be realized that the key sharing system as described hereinafter can be used for the key sharing circuits 315, 332 of the first through third embodiments.

Figure 13:
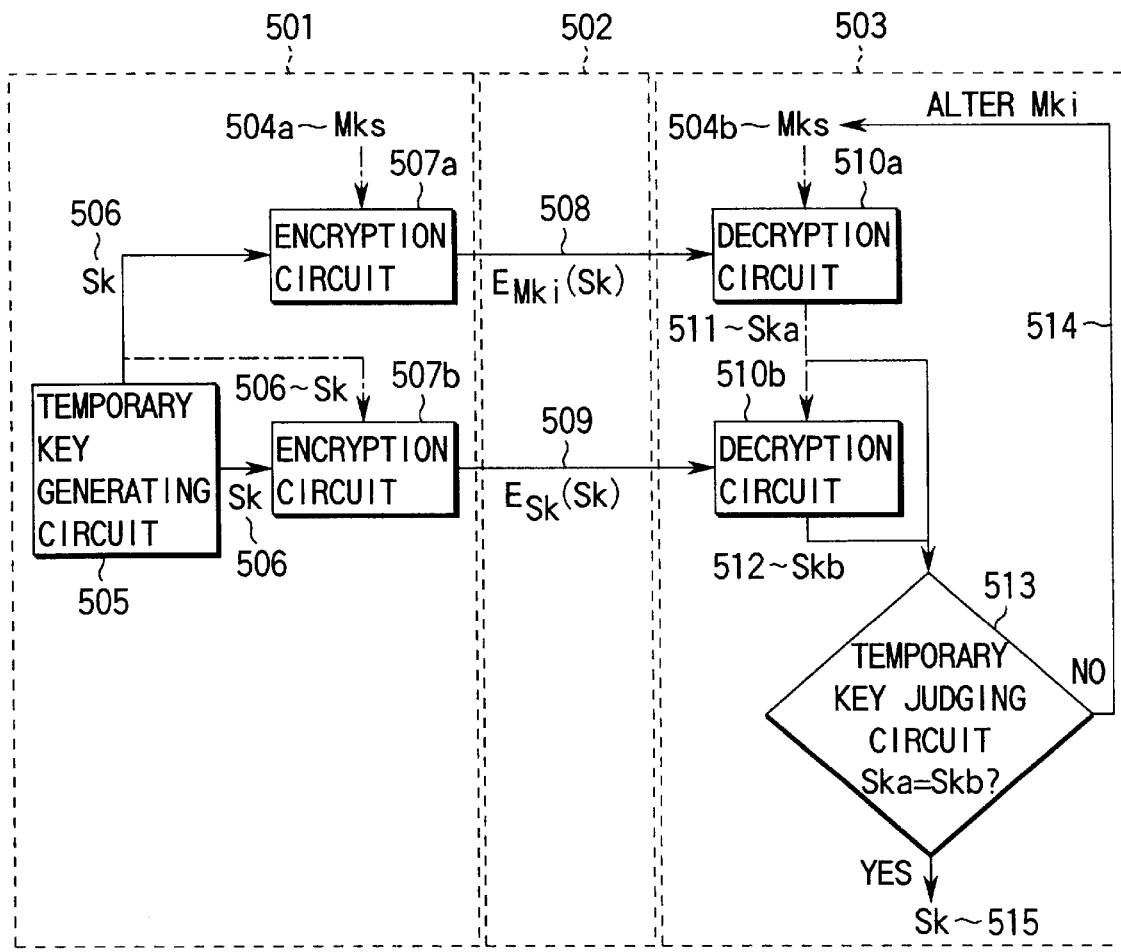
FIG. 13 is a schematic illustration of a system designed for a pair of digital recording/reproducing apparatus to share a temporary encryption key by utilizing the respective master key bundles in a fourth embodiment of the invention.

FIG. 13 is a schematic illustration of a system designed for a pair of digital recording/reproducing apparatus to share a temporary key by utilizing the respective master key bundles of the apparatus. The apparatus are connected with each other by a network or a cable and share a temporary key for encrypting/decrypting confidential information to be transmitted through the network or the cable. In the following description, the transmitter and the receiver are connected with each other by an IEEE 1394 cable and share a temporary key.

Referring to FIG. 13, the transmitter 501 and the receiver 503 are connected with each other by way of an IEEE 1394 cable 502. The master key bundle 504a (Mks) is recorded in the transmitter and the master key bundle 504b (Mks) is recorded in the receiver 503. While the two master key bundles may be different from each other, they have to share a certain number of keys. It is assumed in the following description that the two master key bundles (Mks) are identical.

The transmitter 501 comprises a temporary key generating circuit 505 and encryption circuits 507a, 507b, which operate for sharing a key.

The temporary key generating circuit 505 is adapted to generate a temporary key to be used for temporarily encrypting the data being transmitted through the network or the cable. The temporary key generation circuit 505 preferably has a random number generator adapted to generate random numbers having a specific length.

The temporary key 506 (Sk) is generated by the temporary key generating circuit 505.

The encryption circuit 507a is adapted to encrypt the temporary key 506 by means of one of the keys of the master key bundle 504a and the encryption circuit 507b is adapted to encrypt the temporary key Sk by means of the temporary key Sk. However, the encryption circuits 507a and 507b may be made identical relative to each other if they are adapted to operate identically for encrypting the temporary key. In FIG. 13, EMki (Sk) 508 denotes the output of the encryption circuit 507a, whereas ESk (Sk) 509 denotes the output of the encryption circuit 507b.

On the other hand, the receiver 503 comprises decryption circuits 510a, 510b and a temporary key judging circuit 513, which operate for sharing a key.

The decryption circuit 510a decrypts the output of the encryption circuit 507a by means of the master key bundle Mki. The decryption circuit 510b decrypts the output of the encryption circuit 507a by means of the output of the decryption circuit 510a.

In FIG. 13, Ska 511 denotes the output of the decryption circuit 510a, whereas Skb 512 denotes the output of the decryption circuit 510b.

The temporary key judging circuit 513 is a circuit that compares the output of the decryption circuit 510a and that of the decryption circuit 510b and decides the right key. Control signal 514 is used to alter the master key bundle depending on the judgment of the circuit 513 and Sk 515 in FIG. 13 denotes the temporary key obtained as a result of the judgment.

Now, the operation of the key sharing device of this embodiment having the above configuration will be described below.

If there is only one master key (which will be referred to as Mk0), the transmitter 501 simply encrypts the Mk0 by means of Sk and the encrypted key, which is EMk (Sk), is sent to the receiver 503, which decrypts the SMk (Sk) by means of the Mk0 to take out Sk. However, if the confidentiality of the master key is lost, it has to be replaced by a new one and the old device may become no longer interchangeable with the new device.

In view of this problem, with this embodiment, the information for directly identifying the master key Mki selected and used out of a plurality of master keys of the master key bundle Mks is not transmitted from the transmitter 501 to the receiver 503. Instead, information adapted to identify the master key Mki (which refers to EMki (Sk) 508 and ESk (Sk) 509 in this embodiment) is transmitted from the transmitter 501 to the receiver 503 and the receiver 503 identifies the master key Mki used for encrypting the Sk out of the plurality of master keys and actually acquires the Sk.

Figure 14:
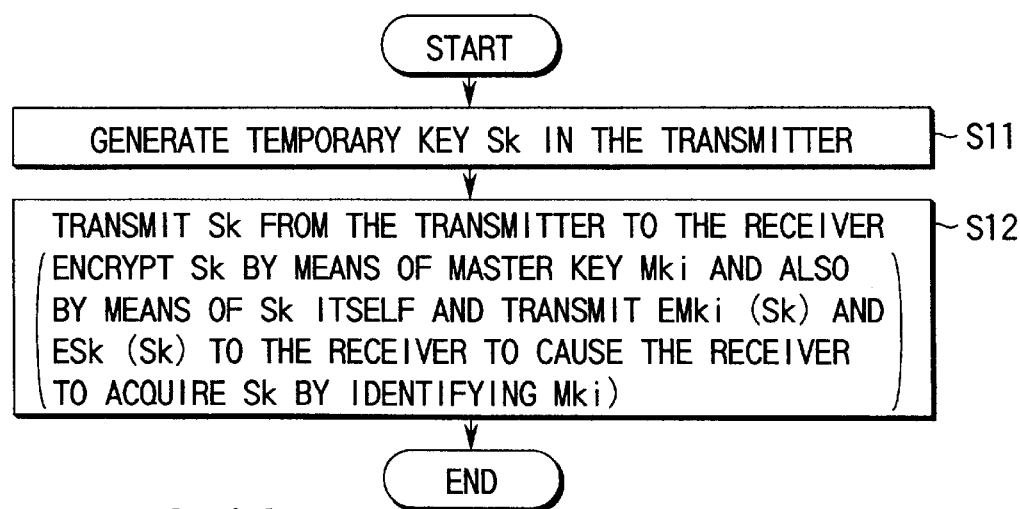
FIG. 14 is a schematic flow chart of the operation of the embodiment of FIG. 13.

FIG. 14 is a schematic flow chart of the operation of the embodiment of FIG. 13.

Referring to FIG. 14, firstly the temporary key generating circuit 505 of the transmitter 501 generates a temporary key 506 to be shared by the receiver 503 (S11).

The processing operation of Step S12 in FIG. 14 will be described in detail below.

The generated Sk is then encrypted by one (Mki) of a total of n master keys (corresponding to the common key of a common key encryption system) of the master key bundle 504a, that is randomly or sequentially selected. In other words, the temporary key Sk is encrypted by Mki selected out of Mks (S=1, . . . , n; n being an integer equal to or greater than 2) by means of the encryption circuit 507a to obtain EMki (Sk).

The master key Mks has been registered in advance but the user cannot see it. If it is recognized that the confidentiality of some of the master keys has been lost, they will be eliminated from the master key bundle of the transmitter. The may or may not be eliminated from the master key bundle of the receiver. However, in the case of IEEE 1394, there is no saying which apparatus operates as transmitter or receiver (because digital recording/reproducing apparatus such as D-VCRs and DVD-RAMs can operate both as transmitter and receiver), it is desirable that the master keys having lost their confidentiality are eliminated from the master key bundle of the receiver either. Note that the entire operation is controlled by the controller (not shown) of each apparatus. The controller may be realized by a built-in CPU contained in the apparatus and provided with a program.

Then, Sk is encrypted by the encryption circuit 507b, using Sk itself, to obtain ESk (Sk). Then, the EMki (Sk) and the ESk (Sk) are transmitted to the data main body by way of the IEEE 1394 cable 502.

The receiver 503 firstly selects a master key (which will be Mkp). The selected Mkp is used as encryption key by the decryption circuit 510a to obtain DMkp (EMki (Sk))=Ska.

Then, ESk (Sk) is decrypted by the decryption circuit 510b, using the output Ska of the decryption circuit 510a as decryption key to obtain DSka (ESk (Sk))=Skb.

Thereafter, the temporary key judging circuit 513 checks if Ska and Skb agree with each other. If the master key Mki used for encrypting Sk in the transmitter 501 is Mkp, then Ska=DMkp (EMki (Sk))=Sk and therefore Skb=DSka (ESk (Sk))=DSk (ESk (Sk))=Sk, hence Ska=Skb=Sk.

Thus, if the temporary key judging circuit 513 determines that Ska and Skb agree with each other, Mki=Mkp and Ska=Skb=Sk.

Then, the temporary key judging circuit 513 outputs Ska=Skb=Sk.

If, on the other hand, the temporary key judging circuit 513 determines that Ska and Skb do not agree with each other, then Mki≠Mkp so that the transmitter 501 can find out that the Mkp is not used but some other master key is used to encrypt Sk. Then, the temporary key judging circuit 513 does not output anything or the output of the temporary key judging circuit 513 will not be sent to the downstream.

Thereafter, Mkp is shifted until Ska comes to agree with Skb, repeating the above described decrypting operation. For example, if Ska and Skb do not agree with each other when Mkp and Mk1 are used for the above operation, then the operation will be repeated by using Mk2.

Thus, with the above described operation, the receiver 503 can identify the master key used by the transmitter 501 for the encryption and the transmitter 501 and the data main body can securely share the temporary key Sk.

As described above, this embodiment of device for preventing fraudulent copies is adapted to make the transmitter 501 and the receiver 503 share a temporary key Sk by using a master key to provide an additional effect relative to the first through third embodiments so that it can reliably and effectively baffle any attempt of fraudulently drawing out the data from the cable connecting the related apparatus and recording it for pirating.

5th Embodiment of the Invention

With this embodiment, a technique of sharing a temporary key other than the one using master keys will be described by referring to FIGS. 15 and 16.

This technique is realized by utilizing the technology described in "Nikkei Electronics, No. 676, pp. 13–14, 1996. 11. 18".

Figure 15:
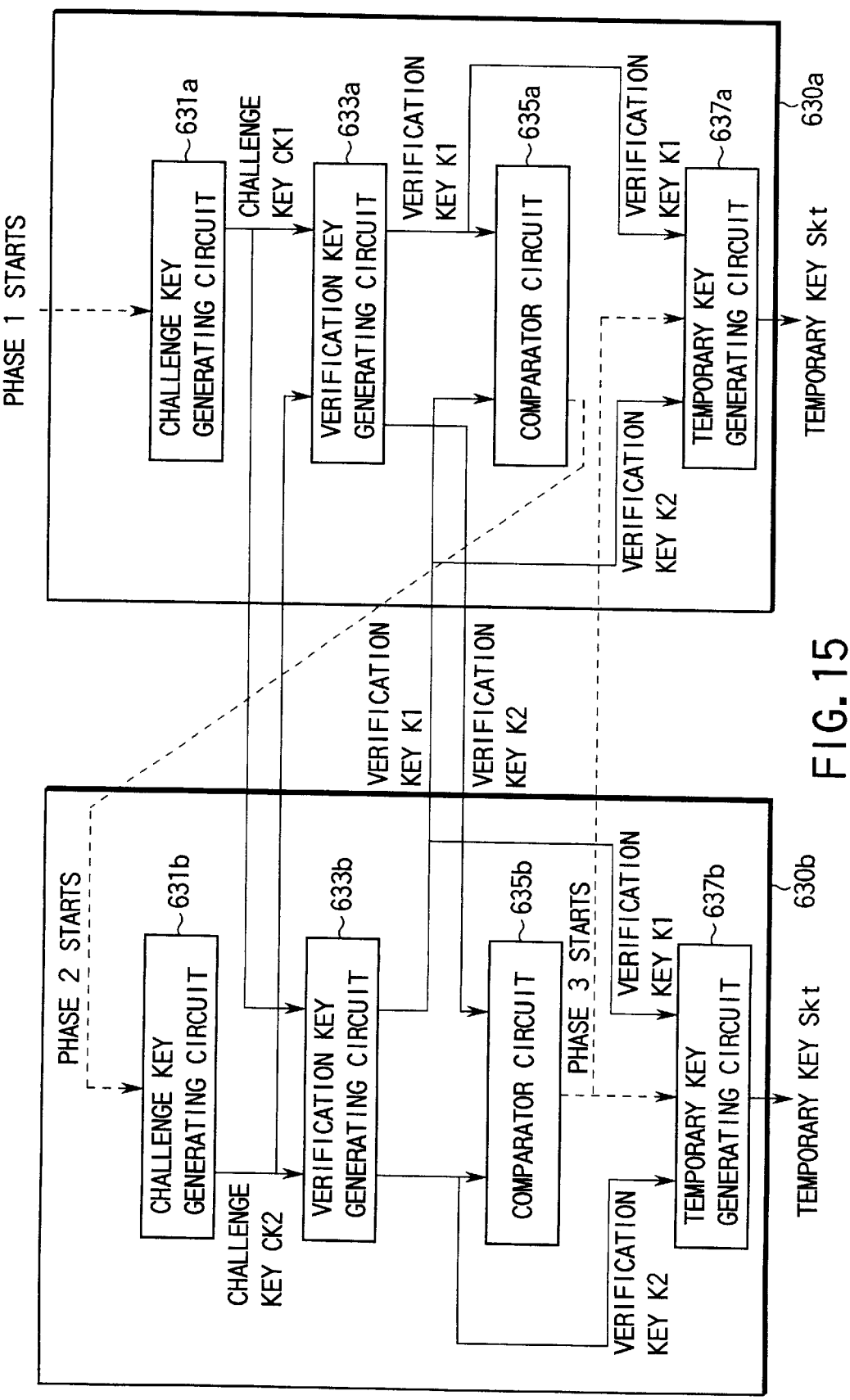
FIG. 15 is a schematic block diagram of a key sharing circuit to be used in a fifth embodiment of the invention.

FIG. 15 is a schematic block diagram of a key sharing circuit to be used in the fifth embodiment of the invention.

Figure 16:
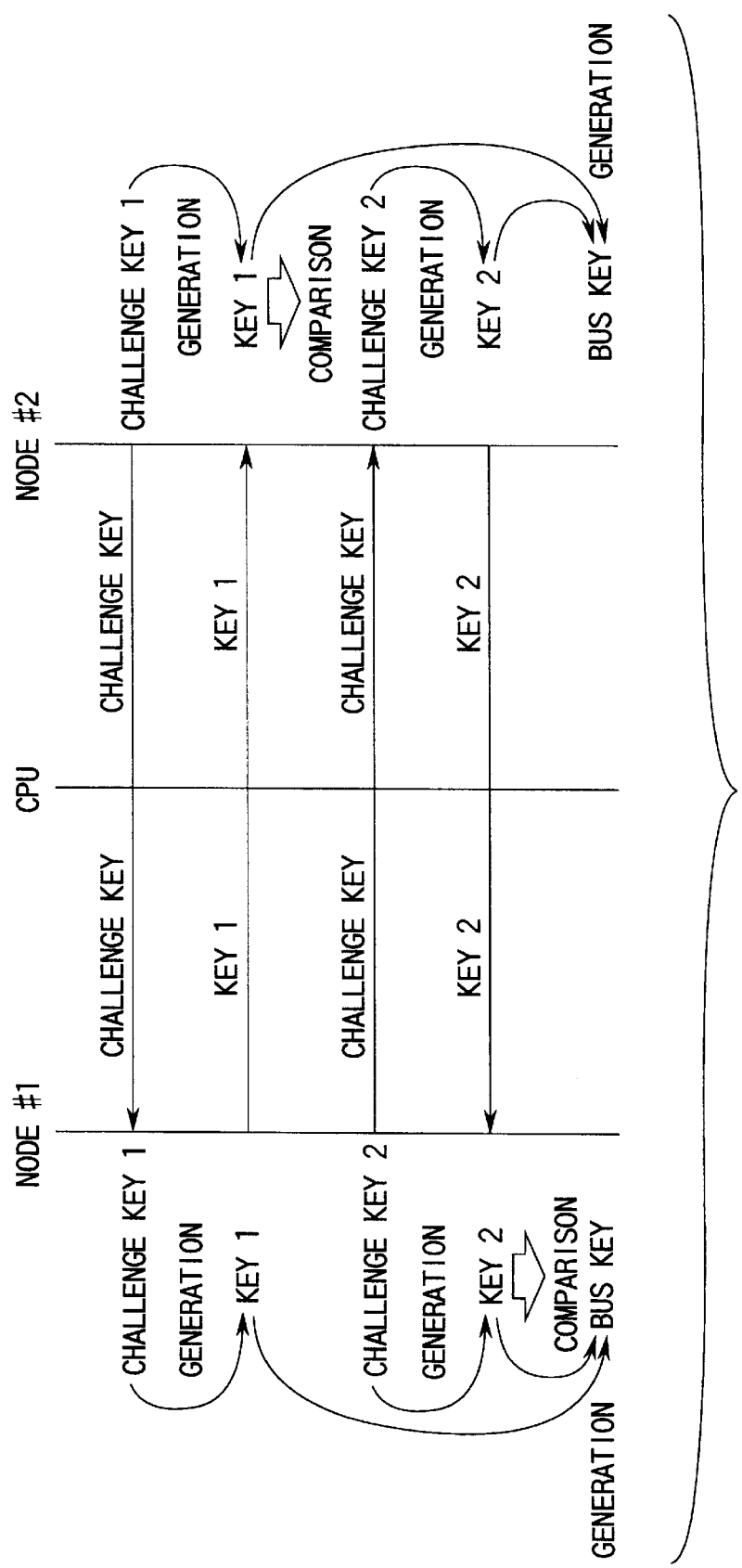
FIG. 16 is a schematic illustration of a system designed for a pair of digital recording/reproducing apparatus to share a temporary encryption key by means of a key sharing circuit without using the master key bundle.

FIG. 16 is a schematic illustration of a system designed for a pair of digital recording/reproducing apparatus to share a temporary encryption key by means of a key sharing circuit without using a master key bundle.

Assume that nodes are allocated to the apparatus mutually connected by IEEE 1394 and node #1 and node #2 shown in FIG. 16 share a temporary key. Referring firstly to FIG. 15, key sharing circuits 630a, 630b to be used for the key sharing procedure of this embodiment will be described.

The key sharing circuit 630a comprises a challenge key generating circuit 631a, a verification key generating circuit 633a, a comparator circuit 635a and a temporary key generating circuit 637a.

Similarly, the key sharing circuit 630b comprises a challenge key generating circuit 631b, a verification key generating circuit 633b, a comparator circuit 635b and a temporary key generating circuit 637b.

The challenge key generating circuits 631a, 631b are adapted to generate challenge keys that vary by each generation by means of a random number generating algorithm.

The verification key generating circuit 633a, 633b generate verification keys from a challenge key typically by means of a one-directional function.

The comparator circuits 635a, 635b compares if any given two verification keys agree with each other or not.

The temporary key generating circuits 637a, 637b generates temporary keys from a pair of verification keys, utilizing a one-directional function.

The verification key generating circuit 633a and the verification key generating circuit 633b are adapted to generate identical verification keys for a same challenge key by using a same algorithm.

The temporary key generating circuit 637a and the temporary key generating circuit 637b are adapted to generate identical temporary keys from two identical verification keys by using a same algorithm.

Now, the procedure of sharing a key will be described by referring to FIGS. 15 and 16.

Firstly in phase 1 of the key sharing means, the challenge key generating circuit 631a generates challenge key CK1 at the node #2 and transmits it to the node #1.

Then, the verification key generating circuit 633a at the node #2 and the verification key generating circuit 633b at the node #1 generate respective verification keys (key1) K1, K1 from the challenge key CK1 and the verification key K1 generated at the node #1 is transferred to the node #2.

Then, the comparator circuit 635a at the node #2 compares the two verification keys K1, K1 generated at the node #2 and at the node #1 respectively. If they agree with each other, the operation proceeds to phase 2. If they do not, the operation will be abnormally terminated.

Then, in phase 2, the challenge key generating circuit 631b at the node #1 generate a challenge key CK2 and transmits it to the node #2.

Thereafter, the verification key generating circuit 633b at the node #1 and the verification key generating circuit 633a at the node #2 generate respective verification keys (key1) K2, K2 from the challenge key CK2 and the verification key K2 generated at the node #2 is transferred to the node #1.

Then, the comparator circuit 635b at the node #1 compares the two verification keys K2, K2 generated at the node #1 and at the node #2 respectively. If they agree with each other, the operation proceeds to phase 3. If they do not, the operation will be abnormally terminated.

In phase 3, the temporary key generating circuit 637a at the node #2 and the temporary key generating circuit 637b at the node #1 respectively generate temporary keys (BUS keys) or temporary keys (Skt) from the verification keys K1, K1 and the verification keys K2, K2.

Thus, the node #1 a nd the node #2 securely share the temporary key Skt.

As described above, this embodiment of device for preventing fraudulent copies is adapted to make the transmitter and the receiver share a temporary key Sk without using a master key to provide an additional effect relative to the first through third embodiments so that it can reliably and effectively baffle any attempt of fraudulently drawing out the data from the cable connecting the related apparatus and recording it for pirating.

It should be noted that present invention is not limited to the above described embodiments, which may be modified in various ways without departing from the scope of the invention.

The techniques described above by referring to the embodiments may be realized in the form of programs that can be executed by a computer and stored in a memory such as a magnetic disc (floppy disc, hard disc, etc.), an optical disc (CD-ROM, DVD, etc.) or a semiconductor memory so that they may be transmitted and distributed by way of telecommunication media. The computer selected to realize the invention will then read the program stored in the memory and be controlled by the program to carry out any of the above described operations. For the purpose of the invention, the computer refers to any information processing apparatus such as digital recording/reproducing apparatus.

Thus, as described above in detail, the present invention provides a device and method for preventing any fraudulent copies of data by prohibiting access to the copy management section of the data.

Additionally, the present invention provides a device and method for preventing any fraudulent copies of data by prohibiting any effective reproduction of fraudulently copied data.

A device and method for preventing any fraudulent copies of data according to the invention are elaborately designed and operate highly effectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device to be used with digital data copying apparatus for preventing fraudulent copies of a digital data;

said digital data containing an encrypted data main body, encrypted copy management information for controlling permission with regard to copying the data main body and key information for decrypting said data main body;

said device containing:

a determining section for determining if permission be granted for copying digital data or not based on if the copy management information satisfies predetermined requirements or not; and a key altering section for altering said key information contained in said digital data when the determining section determines that permission should not be granted for copying said digital data; and wherein said key information includes a plurality of different keys that are used in common to a plurality of recording mediums, and when the determining section determines a copy-prohibited state of the digital data, the key altering section alters the key information corresponding to the copy-prohibited digital data.

2. A device for preventing fraudulent copies of a digital data according to claim 1, wherein said encryption key for encrypting the data main body and said encryption key for encrypting the copy management information are identical relative to each other.

3. A device for preventing fraudulent copies of a digital data according to claim 1, wherein said copy management information includes generation management information indicating the number of generations existing between the original data and said copied digital data inclusive of the latter and numerical management information indicating the number of copies already made;

said determining section determines to prohibit no more copy from being made when said generation management information indicates a predetermined generation and said numerical management information indicates a predetermined number of copies.

4. A device for preventing fraudulent copies of a digital data according to claim 1, wherein said copy management information includes generation management information indicating the number of generations existing between the original data and said copied digital data inclusive of the latter and said determining section determines to prohibit no more copy from being made when said generation management information indicates a predetermined generation, said generation management information comprising data of three bits or more.

5. A method to be used with digital copying apparatus for preventing fraudulent copies of digital data;

said digital data containing an encrypted data main body, encrypted copy management information for controlling permission with regard to copying the data main body and key information for decrypting said data main body;

said method comprises steps of:
  determining if permission for copying said digital data or not based on if the copy management information satisfies predetermined requirements or not; and
  altering said key information contained in said digital data when the determining section determines that permission should not be granted for copying said digital data; and wherein said key information includes a plurality of different keys that are used in common to a plurality of recording mediums, and when the determining section determines a copy-prohibited state of the digital data, the key altering section alters the key information corresponding to the copy-prohibited digital data.

6. A method to be used with digital data copying apparatus for preventing fraudulent copies of a digital data comprising the steps of:

adding to said digital data copy management information containing generation management information composed of a first number of bits with predetermined bit orders changed corresponding to operations of making a copy of said digital data to indicate the generation of said digital data as descendent of the original data, and numerical management information to indicate the number of copies made from the digital data;
  prohibiting any operation of copying said digital data when said generation information indicates a predetermined generation and said numerical management information indicates a predetermined number of copies, and
  wherein the number of generations for which a copying operation is permitted is controlled on the basis of the generation management information, and a copying information which represents the number of copying operations executable for each generation.

7. A device for preventing fraudulent copies of a digital data, said digital data including an encrypted data main body and encrypted copy management information for controlling permission with regard to copying the data main body, said device comprising:

a determining section for determining if permission be granted for copying said digital data or not based on if the copy management information satisfies predetermined requirements or not; and
  a prohibition processing section for prohibiting any operation of effectively copying said digital data when the determining section determines that permission should not be granted for copying said digital data; and
  wherein said copy management information includes generation management information composed of a first number of bits with predetermined bit orders changed corresponding to operations of making a copy of said digital data to indicate the number of generations existing between the original data and said copied digital data inclusive of the latter and said copied digital data inclusive of the latter and numerical management information indicating the number of copies already made; and
  said determining section determines to prohibit no more copies from being made when said generation management information indicates a predetermined generation and said numerical management information indicates a predetermined number of copies; and
  wherein the number of generations for which a copying operation is permitted is controlled on the basis of the generation management information, and a copying operation for digital data is managed on the basis of the numerical management information which represents the number of copying operations executable for each generation.

8. A device for preventing fraudulent copies of a digital data according to claim 7, wherein said encryption key for encrypting the data main body and said encryption key for encrypting the copy management information are identical relative to each other.

9. A device for preventing fraudulent copies of a digital data according to claim 7, wherein said copy management information includes generation management information indicating the number of generations existing between the original data and said copied digital data inclusive of the latter and said determining section determines to prohibit no more copy from being made when said generation management information indicates a predetermined generation, said generation management information comprising data of three bits or more.

10. A device for preventing fraudulent copies of a digital data according to claim 7, further comprising an encrypting means for encrypting said digital data or a decrypting means for decrypting said digital data, using a temporary key to be shared by said transmitter and said receiver as encryption key or decryption key, whichever appropriate, to transmit said digital data from the transmitter to the receiver.

11. A recording medium for storing data having a computer-readable data structure, comprising:

a determining section for determining if permission be granted for copying said digital data or not based on if the copy management information satisfies predetermined requirements or not; and
  a prohibition processing section for prohibiting any operation of effectively copying said digital data when the determining section determines that permission should not be granted for copying said digital data; and
  wherein said copy management information includes generation management information composed of a first number of bits with predetermined bit orders changed corresponding to operations of making a copy of said digital data to indicate the number of generations existing between the original data and said copied digital data inclusive of the latter and said copied digital data inclusive of the latter and numerical management information indicating the number of copies already made; and
  said determining section determines to prohibit no more copies from being made when said generation management information indicates a predetermined generation and said numerical management information indicates a predetermined number of copies; and wherein the number of generations for which a copying operation is permitted is controlled on the basis of the generation management information, and a copying operation for digital data is managed on the basis of the numerical management information which represents the number of copying operations executable for each generation.

* * * * *

UNITED STATES PATENT AND TRADEMARK OFFICE
CERTIFICATE OF CORRECTION

PATENT NO.    : 6,343,281 B1
DATED         : January 29, 2002
INVENTOR(S)   : Takehisa Kato It is certified that error appears in the above-identified patent and that said Letters Patent is hereby corrected as shown below:

<u>Column 21,</u>
Line 9, "digital copying" should read -- digital data copying --.
Line 17, "permission for" should read -- permission be granted for --.
Line 48, "copies, and" should read -- copies; and --.
Line 52, before "information which", insert -- operation for digital data is managed on the basis of the numerical management --.

Signed and Sealed this

Twenty-seventh Day of August, 2002

*Attest:*

JAMES E. ROGAN
*Attesting Officer*        *Director of the United States Patent and Trademark Office*